Feb. 17, 1948.  H. J. A. BECK  2,436,031
HAY STACKER
Filed March 14, 1946  2 Sheets-Sheet 2
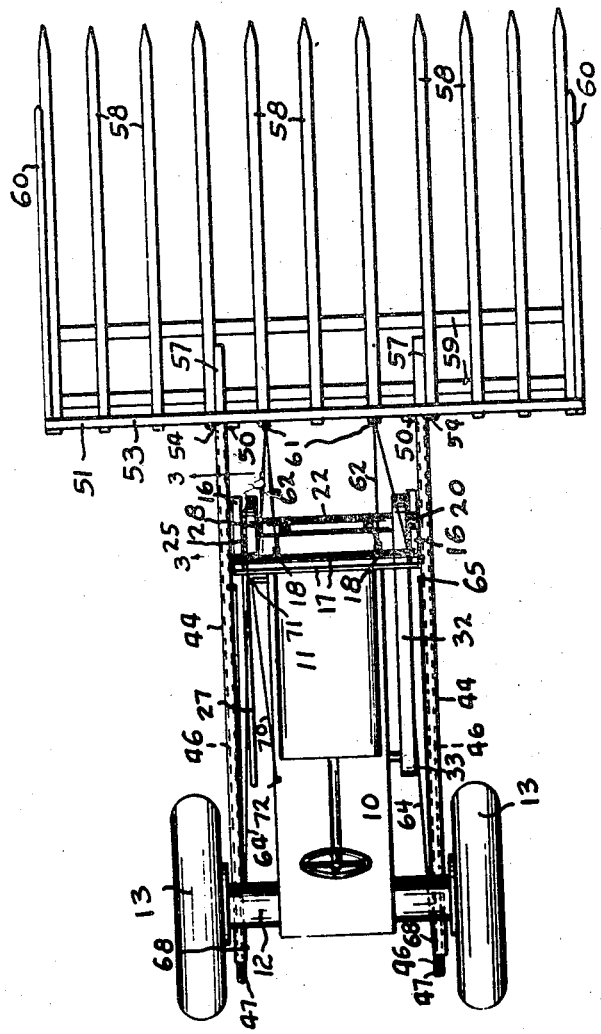
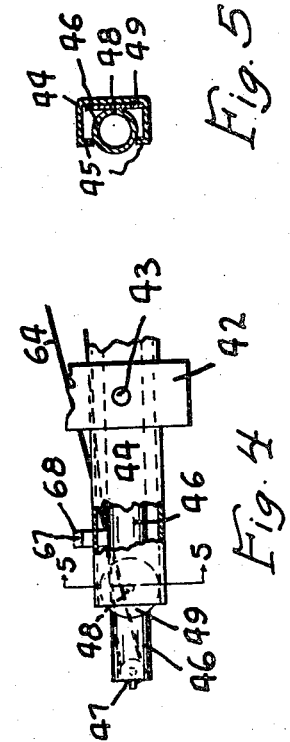
INVENTOR.
Harold J. A. Beck
BY
Sam J. Slotky
ATTORNEY Patented Feb. 17, 1948

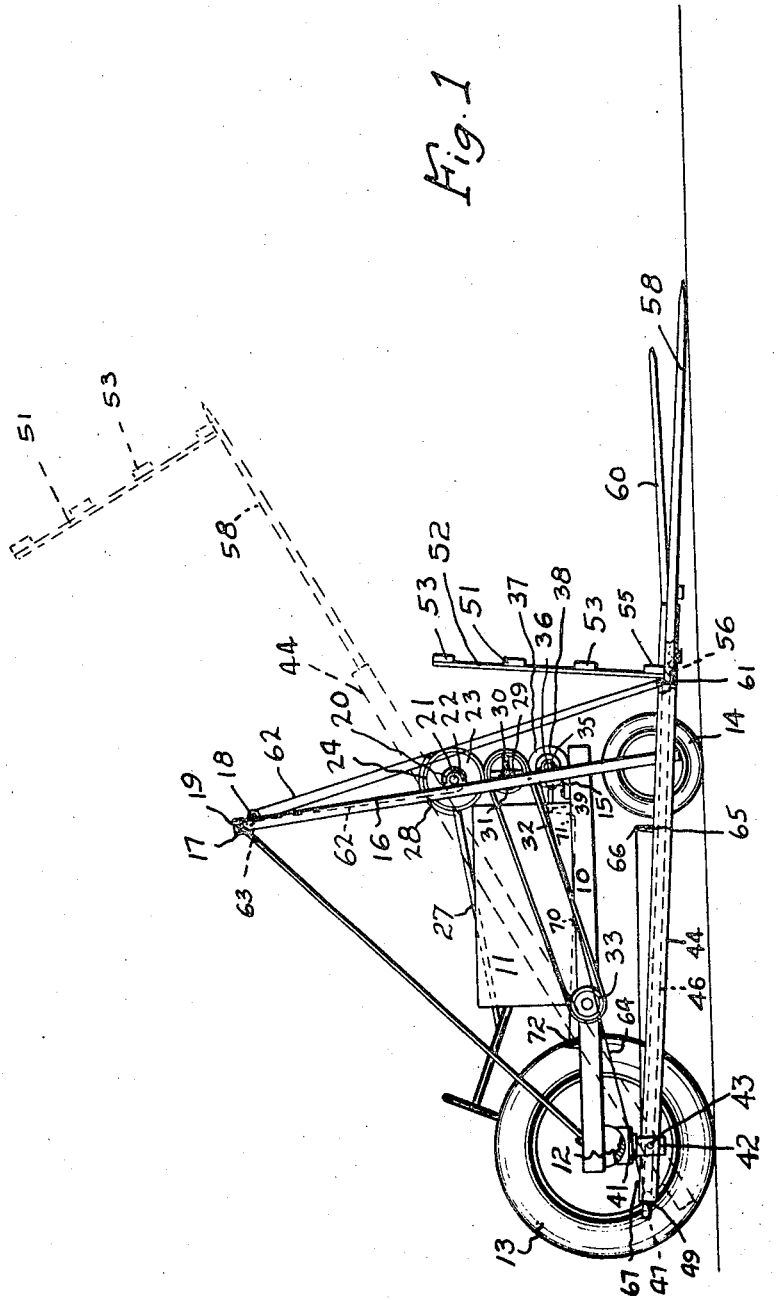

2,436,031

UNITED STATES PATENT OFFICE 2,436,031

HAY STACKER

Harold J. A. Beck, Hinton, Iowa

Application March 14, 1946, Serial No. 654,302

1 Claim. (Cl. 214—131)

My invention relates to a hay stacker

An object of my invention is to provide a stacker which is driven from a standard tractor, which is elevated by the tractor power take-off, which includes an automatically driven push off which is operated from the tractor, which includes convenient means for operating the rake lifting mechanism, as well as the push off, and which requires a minimum of moving parts.

A further object of my invention is to provide an arrangement wherein all of the essential reeling parts are located forwardly of the tractor, so that the arrangement can be conveniently used as an accessory unit.

A further object of my invention is to provide all of the above objects in a simple construction.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Fig. 1 is a side elevation of the stacker.

Fig. 2 is a plan view of the stacker.

Fig. 3 is a detail, taken along the lines 3—3 of Fig. 2.

Fig. 4 is a further detail, and

Fig. 5 is a sectional detail of Fig. 4 taken along the lines 5—5 thereof.

I have used the character 10 to designate a tractor frame, the character 11 the hood, the character 12 the rear axle, the character 13 rear wheels, and the character 14 the forward wheels.

Attached to the tractor brackets 15, I provide a pair of substantially vertical supports 16 which are braced across the tops thereof at 17. A pair of pulleys 18 are attached at 19. A journal 20 is attached to one member 16 which journal receives the shaft 21 which is secured within the reel 22 (see Fig. 3). Attached to one end of the reel 22, is a drum 23 to which is attached the rubber or other similar frictional band 24. The further end of the shaft 21 is secured within a suitable bearing, which is attached to the lever arm portion 25 which is pivoted at 26, and the arm 25 continues into the extended lever 27 which extends rearwardly a suitable distance, so that it can be manipulated by the operator of the tractor. A brake drum member 28 is rigidly attached to one of the supports 16, and is adapted to engage the band 24 when in inoperative position.

Journaled at 29 is a further shaft 30 which is attached at one end to the pulley 31 which is driven by means of the belt 32 passing over the power take-off pulley 33 of the tractor, and attached at the other end thereof is a wheel 34. Also journaled on the member 16 at 35 is a shaft 36 which is attached to a pair of drums 37 to which are attached the reeling portions 38, and attached at one extremity of the shaft 36 is a similar journal which is attached to a lever arm 39 which is pivoted at 40 to a member 16.

Attached at 41 to either side of the tractor frame, and beneath the same are a pair of brackets 42 to which are pivotally attached at 43 a pair of forwardly extending channels 44 having the side webs 45 (see Fig. 5), and received within the channels 44 are a pair of lengthened pipes 46, at the termination of which pipes are attached pulleys 47, and rotatably attached adjacent to the pipes 46 on the pins 48 are the roller discs 49 which are adapted to roll along the channels 44. Attached at 50 to the forward ends of the pipes 46 is a push member 51 comprising the vertical braces 52 and the transverse members 53. Attached at the bottom of the member 51 is a lower cross member 55 including a cut out portion at 56 which freely receives the forward portions of the channels 44. Attached to the channels 44 at 57 is a rake member having a series of equally spaced forwardly projecting tines 58, and attached beneath and to the tines 58 are the bracing bars 59. It should be noted that the entire rake structure is rigidly secured to the channels 44, but the push member 51 will slide along the tines with the rollers 54 rolling along certain of the tines (see Fig. 2). The rake also includes the side pieces 60.

Attached to the rake itself are a pair of pulleys 61. A pair of cables 62 are attached at 63 to the vertical members 16 and extend downwardly, passing under the pulley 61, thence passing upwardly over the pulleys 18 and thence downwardly where they are then attached to the reel 22. A pair of further cables 64 are attached to the reels 38 and thence pass under the small pulleys 47, and thence over the same and back to the stop members 65 which are attached to the channels 44. Attached to the pipes 46 are a pair of abutment members 67, which include the outwardly extending flanges 68 adapted to contact against the members 65 to limit outwardly movement of the push member 51.

Attached at 69 to the lever 39 is a cable 70 which passes downwardly under a pulley 71 and is tied to the rear of the tractor at 72.

The device is operated in the following manner. The rake tines 58 normally being as shown in Fig.

1, are driven forward by means of the tractor whereby the hay is gathered on the tines and forced rearwardly to the member 51. The tractor is then driven to the desired position for depositing the hay, and the lever 27 is then forced upwardly which causes the band 24 to contact against the wheel 34, which wheel is driven by means of the shaft 30 which shaft is turned by means of the belt 32, the pulley 31, and the power take-off pulley 33. This starts the reel 22 in operation which draws in the cable 62 which due to the arrangement of this cable over the pulleys 18 and 61, will raise the entire structure on the pivoting point 43 to the approximate position shown by the dotted lines in Fig. 1, or higher if desired.

After the rake is elevated as shown, the cable 70 is pulled at 72, which draws the lever 39 downwardly causing contact between the wheel 37 and the wheel 34 which causes the reels 38 to draw the pair of cables 64 which in passing over the pulleys 47 will draw the pipes 46 forwardly within the channels 44, the rollers 49 serving to provide an easy passage of the pipes therein. The pipes travel forwardly until the portions 68 abut against the members 65 to limit outward movement of the member 51. It will be noted that the pipes 46, since they are attached to the member 51 will thereby push it along the tines 58, until it reaches the approximate position shown by the dotted lines in Fig. 1, at the same time forcing the gathered hay off of these tines and on to the stack.

Before the push off operation, the lever 27 is forced downwardly which holds the band 24 against the brake 28, and in this way the reel is locked in the upper position while the push off operation takes place. After the member 51 is forced outwardly, the cable 70 is released which correspondingly releases the wheel 37 from engagement with the wheel 34, and the member 51 will then slide and fall by gravity back to its original position. The rake is then allowed to gradually fall to its normal horizontal position by manipulating the control lever 27 and releasing the brake slowly.

In this way the stacker will function to raise the hay, and then dislodge it at any desired heighth etc.

It will now be noted that I have provided the various advantages mentioned in the objects of my invention with other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

In combination with a power driven tractor, a hay stacker including a pair of beams pivotally mounted at the rear of the tractor and extending forwardly thereof, a rake attached at the forward end of the beams, means for raising said rake including a pair of substantially vertical supporting members attached at the forward end of the tractor, a reel journalled on said vertical members, means for driving said reel from the tractor power take-off, cables attached to the reel and the rake for raising the same, means for locking said reel inculding a brake member, a friction band attached to the reel engaging said brake member, a lever attached to the reel end for causing disengagement of the reel with the brake member, a driving wheel driven by the power take-off, said driving wheel being positioned adjacent to the friction band whereby movement of the lever will cause engagement therewith, a push member slidably mounted on said rake, means for forcing said member along the rake including pipes received in the beams attached to the push member, means for forcing said pipes forwardly including further reels, cables attached to said further reels and to said pipes, means for drivingly engaging said further reels including a pivoted lever, said further reels including adjacent members for engaging said driving wheel, said pipes including rollers attached thereto, said rollers being adapted to roll within the beams.

HAROLD J. A. BECK.

REFERENCES CITED

The following references are of record in the file of this patent:

UNITED STATES PATENTS

| Number | Name | Date |
|---|---|---|
| 2,242,860 | Huelle | May 20, 1941 |
| 2,246,083 | Weber | June 17, 1941 |
| 2,306,313 | Johnson | Dec. 22, 1942 |
| 2,311,523 | Cope et al. | June 17, 1943 |
| 2,397,045 | Richey | Mar. 19, 1946 |
| 2,404,154 | Williams | July 16, 1946 |